United States Patent [19]

Hanakata et al.

[11] 4,444,520
[45] Apr. 24, 1984

[54] INFORMATION OUTPUT DEVICE

[75] Inventors: Takayoshi Hanakata, Yokohama; Shiro Anzai, Yamato, both of Japan

[73] Assignee: Canon Kabushiki Kaisha, Tokyo, Japan

[21] Appl. No.: 434,495

[22] Filed: Oct. 15, 1982

Related U.S. Application Data

[60] Continuation of Ser. No. 197,591, Oct. 16, 1980, abandoned, which is a division of Ser. No. 920,796, Jun. 30, 1978, Pat. No. 4,253,774, which is a continuation of Ser. No. 763,086, Jan. 27, 1977, abandoned, which is a continuation of Ser. No. 551,396, Feb. 20, 1975, abandoned.

[30] Foreign Application Priority Data

Feb. 22, 1974 [JP] Japan .................................. 49-21680
Feb. 22, 1974 [JP] Japan .................................. 49-21681
Feb. 22, 1974 [JP] Japan .......................... 49-21835[U]
Feb. 22, 1974 [JP] Japan .................................. 49-21836

[51] Int. Cl.³ .............................................. B41J 29/02
[52] U.S. Cl. ..................................... 400/88; 224/267; 400/87; 400/693
[58] Field of Search .................... 400/83, 87, 88, 691, 400/693, 717; 224/219, 220, 167, 197, 267

[56] References Cited

U.S. PATENT DOCUMENTS 552,171 12/1895 Farnham ......................... 224/218 X
2,603,336 7/1952 Julliard ................................ 400/88
3,550,824 12/1970 Bohanski ......................... 224/219 X
3,884,342 5/1975 Mulholland ...................... 400/690.1
3,966,101 6/1976 Taylor ................................. 224/219

OTHER PUBLICATIONS

IBM Tech. Disc. Bulletin, "Wrist Worn Terminal", by C. P. Ludeman, et al., vol. 15, No. 11, Apr. 1973, pp. 3350–3351.

Primary Examiner—Paul T. Sewell
Attorney, Agent, or Firm—Fitzpatrick, Cella, Harper & Scinto

[57] ABSTRACT

An information output device basically comprises character output means for visibly outputting at least one of characters such as letters, numbers, symbols, etc., a keyboard carrying thereon keys corresponding to the characters and usable for the selection of the characters, and a miniature body for containing therein the character output means and the keyboard. Most of the size of the body is occupied by the keyboard. The character output means may be printing means for printing the characters on recording paper, or character display means comprising a plurality of display elements for displaying the characters. The information output device may also include a control circuit for applying a control or driving signal to the printing means or the display elements of the character display means to cause the characters selected by the keys to be printed on the recording paper or to cause the display elements to successively display the characters selected by the keys. The body may also contain therein the control circuit.

14 Claims, 23 Drawing Figures

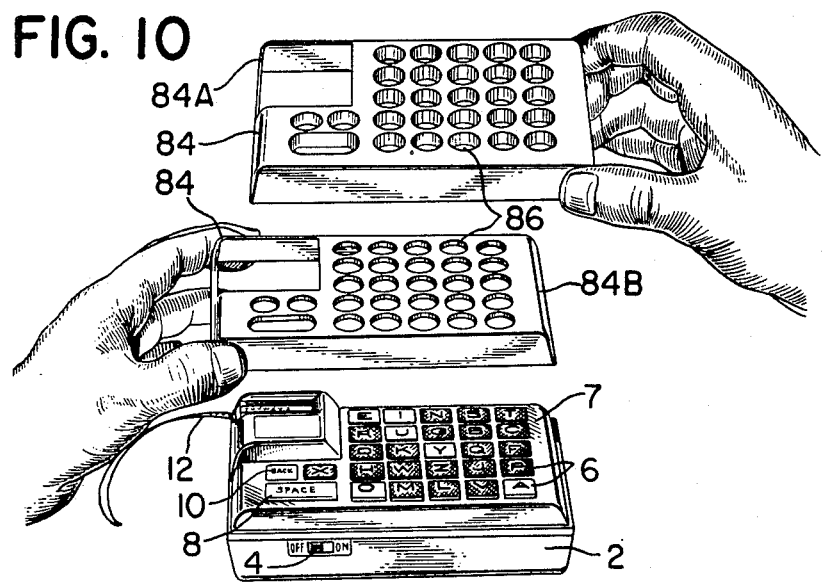
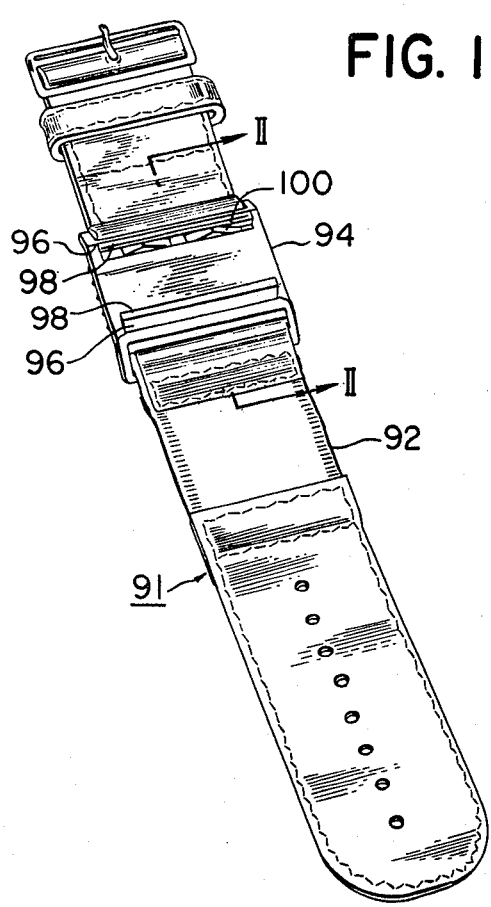

FIG. 19
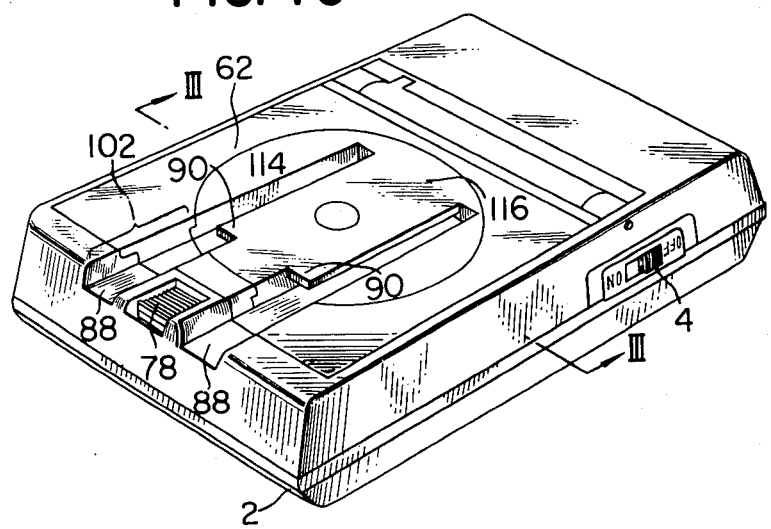
FIG. 20
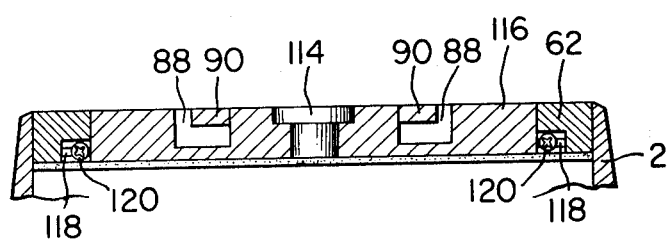
FIG. 21
(a) 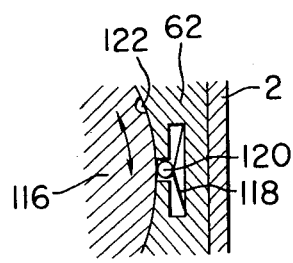   (b) 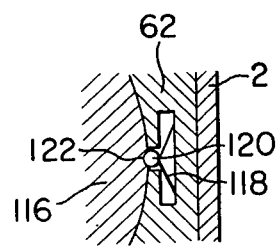

INFORMATION OUTPUT DEVICE

This is a continuation of application Ser. No. 197,591, filed Oct. 16, 1980, now abandoned, which was a division of application Ser. No. 920,796 filed June 30, 1978, 4,253,774, which was a continuation of application Ser. No. 763,086, filed Jan. 27, 1977, now abandoned, which was a continuation of application Ser. No. 551,396 filed Feb. 20, 1975, now abandoned.

BACKGROUND OF THE INVENTION

1. Field of the Invention

This invention relates to an information output device. The information output device of the present invention is particularly effective for use by deaf-mutes when they want to converse or communicate with each other without oral intermedium.

2. Description of the Prior Art

Numerous methods or devices are known which assist deaf-mutes in making or exchanging communications with other deaf-mutes or non-deaf-mutes. The most typical method of such communication is what is called the dactylology, wherein one uses one's hands and other body portions to make communications with others. The dactylology is a method of conversation resorting to movements of the hands or face following predetermined rules, and is meritorious in that a relatively high degree of conversation can be done quickly, whereas the dactylology requires its learners to have a considerable time for training and skill until they acquire to make conversation freely and in addition, ordinary persons cannot understand the dactylology. For these reasons, the range of its utilization has necessarily been limited.

In contrast with the above-described dactylology, there is a method of non-oral conversation which resorts to visible characters and which is not so much limited in the range of utilization but sufficiently applicable for the conversation with non-deaf-mutes. Usually, this is practised often by way of written words and has some merits resulting from the use of characters, such as not only feasibility of reliable communications but also a wide range of utilization and high usefulness, whereas this method is inefficient in that it not only requires writing means and paper for writing down the messages mutually exchanged, but also involves much of procedure and time inasmuch as the communications are effected by means of writing, instead of oral speech.

If some efficient writing means were available, the reliability and efficiency of mutual communication could be enhanced. At present, typewriter is known as a machine which can rapidly print alphanumeric or other characters. Particularly, electric high-speed typewriter can type any desired characters very rapidly and this could sufficiently be applicable as an aid for deaf-mutes to make conversation. On the other hand, the presently known typewriters are not compact and most of them are for use on the desk, and their keys for the selection of characters to be printed are arranged and designed so as to provide the best operability when operated by both hands. It may therefore be said that these typewriters are not always suited as an aid for deaf-mutes to carry it with them at all times and use it to print messages for communication as soon as there is a need for conversation. However, if such typewriters were compact and excellent in portability and operability, they could sufficiently be applied as an aid for deaf-mutes to make conversation.

Thus, there is a demand for typewriters as information output devices which are compact and good in operability.

Supposing a compact typewriter which may be held by one hand and key-operated by the other hand, some special design would be required so that the operability of its key selection may not be aggravated as compared with the common type of typewriters wherein the character selecting keys are operated by both hands. Firstly, compactness of the typewriter would necessarily mean a limited area for the keyboard on which the character selecting keys are arranged. Such a limited area of the keyboard would in turn give rise to a structural problem in arranging on the narrowed keyboard a number of character input keys corresponding to alphanumeric or other characters, as well as the problems of operational reliability and efficiency, namely, the possibility of the keys being operable reliably and rapidly. These problems should be overcome appropriately and economically. Proper considerations should particularly be given to obtainment of a performance which will ensure reliable key input operation, and it will be a matter of great importance that the typewriter should permit reliable key input operation even when it is held under unstable conditions.

The typewriter as information output device for use as an aid for deaf-mutes to make conversations or communications must be capable of being carried with them at all times, as viewed from its intended purpose, and accordingly be excellent in portability. At the same time, inasmuch as it is employed as an aid for mutual communications, it is desirable that such aid can be used as soon as there occurs a need for its use, and some special design therefor must be added.

The typewriter of the described type intended for use in non-oral conversation must also be usable not only by deaf-mutes but also by multi-handicapped deaf-mutes such as limb-disabled or otherwise handicapped ones, and special improvements therefor would be necessary.

Any common typewriter is usually constructed such that printed characters can be seen in regular or erect position as viewed from the key input operator, but since conversation is often done in face-to-face relationship and printed message appears inverse to the partner of the conversation, it may be difficult for the partner to read the printed characters. In this point also, improvements must be made.

Thus, realization of an information output device, e.g. a compact typewriter, as an aid for deaf-mutes to exchange communications efficiently and reliably awaits the solution of various problems.

In addition, a compact typewriter itself would require a novel construction distinguished from that of an ordinary desk-top typewriter in respect of printing method, printing paper, driving mechamism, etc.

Thus, there are further problems to be solved in constructing a compact typewriter as information output device, especially, a typewriter having a printing mechanism effectively applicable as an auxiliary machine portable by a deaf-mute for making voiceless conversation.

The medium usuable for the conversation between deaf-mutes is not limited to the above-described printed messages on recording paper, but it is likely that the same result can be obtained through the agency of a character display device such as electric light notice board which employs light-emitting diode, liquid crystal or the like. Therefore, there is a need for an aid suited for the exchange of not only printed messages but also otherwise formed messages.

The point is that a device which is excellent in portability and operability as an aid usable by deaf-mutes for exchanging communications or messages must be provided.

SUMMARY OF THE INVENTION

It is therefore an object of the present invention to provide an information output device which is compact and excellent in portability.

It is another object of the present invention to provide an information output device which is suitable for operation by one hand and excellent in operability.

It is still another object of the present invention to provide an information output device which is applicable as an aid for deaf-mutes to make conversation.

It is yet still another object of the present invention to provide an information output device which is quite compact and can be mounted on a mount means removably wearable on a portion of a person's body so that the device can be quickly and efficiently used whenever required.

It is a further object of the present invention to provide an information output device which can easily present output messages in regular position with respect to a partner of conversation effected through the agency of characters.

It is still a further object of the present invention to provide an information output device which adopts a novel design in the arrangement of keys on keyboard for the selection of output characters to thereby greatly improve the efficiency of key selection.

It is a further object of the present invention to provide an information output device having a keyboard construction which will further ensure selective depression of keys for the selection of output characters.

It is yet a further object of the present invention to provide an information output device in which the operational performance of the output character selecting keyboard may be changed in accordance with the conditions under which the device is used.

It is a further object of the present invention to provide a novel type of information output device which is designed to compactly accommodate therein a roll of long-footage printing paper and to pay off the printing paper as it is printed with successive desired characters.

It is a further object of the present invention to provide an information output device which is a typewriter having a printing mechanism very simply constructed by a combination of thermosensitive recording paper and thermal printing head.

It is still a further object of the present invention to provide an information output device which is an instrument having a display device for displaying information and is quite compact and light in weight as well as good in operability.

Numerous novel points representing the features of the present invention are pointed out in detail in appended claims which form part of the specification of the application. For the full understanding of the present invention, the advantages in its operation and the objectives which will be achieved by carrying out the invention, reference should be had to the following detailed description taken in conjunction with the accompanying drawings which exemplarily illustrate some preferred embodiments of the invention.

BRIEF DESCRIPTION OF THE DRAWINGS

FIG. 10 shows, in perspective view, keyboard adapters.

FIG. 12 shows, in perspective view, a belt for mounting the typewriter on a wrist.

FIG. 19 is a perspective view for showing the back side of the typewriter which is another embodiment of the information output device according to the present invention.

FIG. 20 is a fragmentary cross-sectional view taken along line III—III in FIG. 19.

FIG. 21 is a fragmentary, horizontal cross-sectional view of the back cover and disc portion of the typewriter shown in FIG. 19.

DESCRIPTION OF THE PREFERRED EMBODIMENTS

Figure 1:
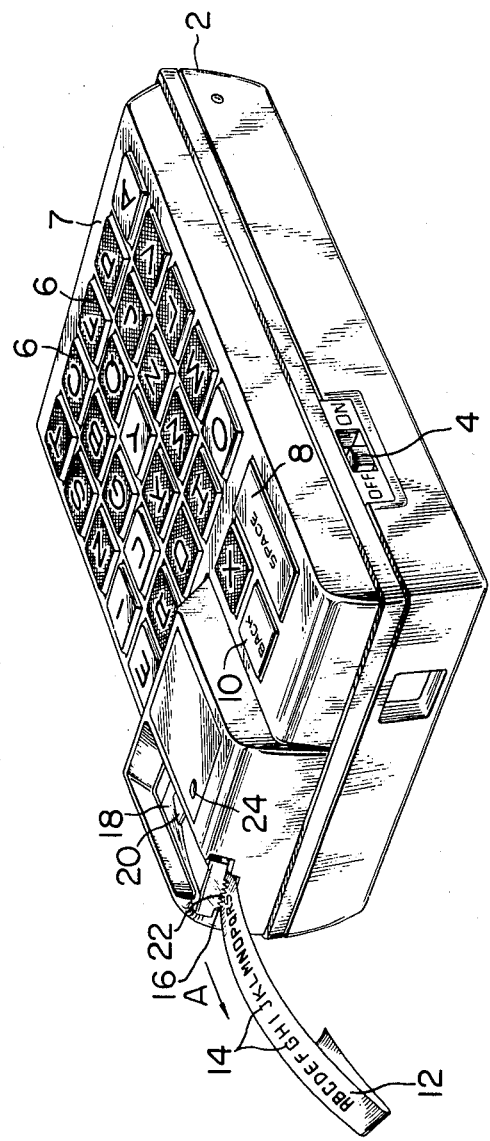
FIG. 1 is a perspective view of a typewriter which is an embodiment of the information output device according to the present invention.

Referring to FIG. 1 which is a perspective view showing an embodiment of the typewriter incorporating the information output device of the present invention, it includes a typewriter body generally designated by 2, a power switch 4, and a group of keys 6 on a keyboard 7 selectable for providing impression of any desired character. The keyboard 7 occupies a size substantially identical with that of the body 2 and occupies most of the space occupied by the typewriter. The typewriter further includes a space key 8 for feeding a later-described strip of recording paper 12 by one character at a time and continuously feeding the paper 12, both in the direction of arrow A, to provide a space between adjacent ones of printed characters, without effecting printing, and a back space key 10 for feeding the recording paper 12 in the direction opposite to the direction of arrow A. The recording paper is a long footage of thermosensitve recording paper on which any desired character selected by a key 6 may be printed with the aid of a thermal head which will further be described. The typewriter also includes a port 16 through which the long footage of recording paper 12 thermally printed with characters 14 may be discharged by one character each time one character is impressed, and a window portion 18 formed of transparent acryl sheet through which the characters 14 may be seen immediately after impressed by the thermal head 20. The thermal head 20 serves to thermally impress the thermal recording paper 12 with any character selected by a key 6. There is further included a cutter 22 provided in a portion of the port 16 for cutting the recording paper 12 when it is discharged through the port 16, and a pilot lamp 24 which may be turned on when the power switch 4 is closed.

The typewriter of such construction is made ready to effect printing with the lamp 24 turned on, by closing the power switch 4. In this state, depression of a key 6 causes the printing head 20 to impress a character on the recording paper 12 through a thermal process, whereupon the recording paper is advanced by one character in the direction of arrow A. The character 14 thus impressed can be seen through the window 18. In this way, the operator can provide print of a desired message on the recording paper by selecting the keys 6 in a desired sequence. The space key 8 is a two-stage push key switch which, upon a first stage depression, feeds the recording paper 12 by one character in the direction of arrow A without effecting impression and, upon a second stage depression, continuously advances the recording paper 12 in the direction of arrow A without effecting impression. The back space key 10 is for feeding the recording paper 12 in the direction opposite to the direction of arrow A without effecting impression, and this is effective to cancel any misprint if it should occur. More specifically, when a misprint has occurred, the back space key 10 may immediately be depressed to bring the misprinted portion of the paper back to the position corresponding to the thermal head 20, whereafter a key other than that for the misprinted character, for example, a key 6 for the character "X" disposed adjacent the back space key 10, may be selected and depressed, whereby one other character, viz. "X", is printed in superposed relationship on the misprinted character, so that the fact of misprinting can easily be recognized.

When a deaf-mute wants to use the typewriter of the above-described construction as an aid for making conversation, he can carry it with him because it is so compact, and at a point of time when he needs to make conversation, he may close the power switch to render the device operative, whereafter he may suitably select and depress keys 6 and space key 8 to provide a desired message on the recording paper 12, and may show or present the message to his partner of the conversation to thereby accomplish communication with the latter. In presenting to the partner the message on the recording paper 12, he may also depress the space key 8 down to the second stage to continuously feed the recording paper 12 in the direction of arrow A and discharge the printed portion of the paper fully out of the port 16 through the window 18, whereafter he may use the cutter 22 to cut off the recording paper 12 to hand over the printed piece of the recording paper 12 to his partner, thereby completing a communication. Conversely, when he wants to take a message from his partner, he may have the typewriter of FIG. 1 operated by the partner in the same way as described above, whereby he may read a printed message on the recording paper 12.

The compact typewriter of FIG. 1, as will be appreciated, can be carried by a deaf-mute with himself and effectively used when he wants to exchange messages with his partner.

Description will now be made in detail about the printing mechanism in the compact typewriter of FIG. 1. In the typewriter of the present embodiment, a combination of thermal head 20 and thermosensitive recording paper 12 is employed to visibly impress any desired characters on the printing paper 12.

Figure 2:
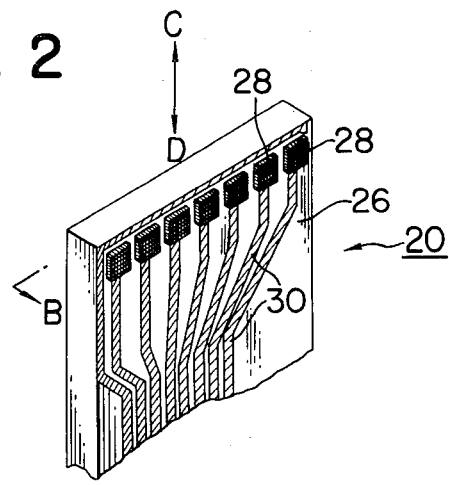
FIG. 2 is a fragmentary perspective view of the thermal head shown in FIG. 1.
Figure 3:
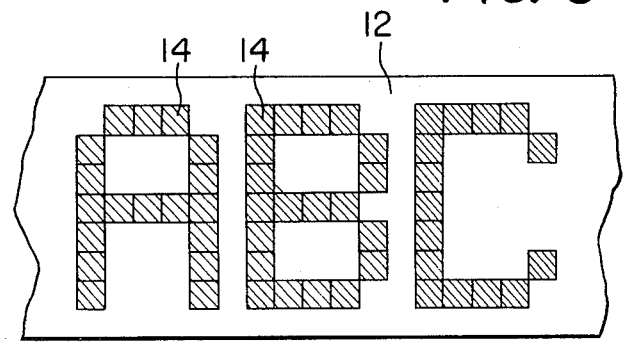
FIG. 3 is a plan view illustrating the manner in which characters are printed on the recording paper.

FIG. 2 shows, in perspective view, the thermal head 20 which comprises a heat-resistant and insulative base plate 26 formed of ceramics or like material, a row of seven islands 28 disposed on the base plate and capable of heating upon electrical energization thereof, and printed wires 30 on the base plate 26 through which an electric current may selectively be applied to the islands 28 to cause heating thereof. In use, such thermal head 20 and the recording paper 12 may be intermittently moved relative to each other in the direction of arrow C or D, with one side face of the head 20, i.e. that side face indicated by arrow D, being slidably urged against the thermosensitive recording paper 12, while the islands 28 are suitably selectively heated during the intermittent stoppage, whereby characters 14 each formed by a combination of $5 \times 7$ dot-matrix dots may be provided and displayed on the recording paper 12 in the manner as shown in FIG. 3.

Figure 4:
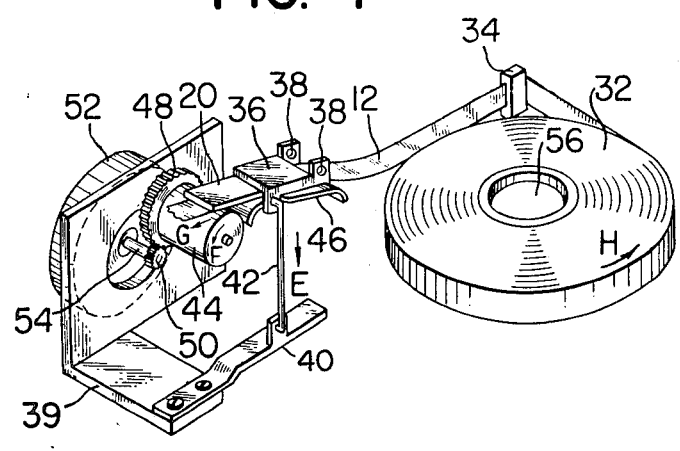
FIG. 4 is a perspective view of the printing mechanism in the typewriter of FIG. 1.

The printing mechanism incorporated in the typewriter body 2 is shown in the perspective view of FIG. 4. The printing mechanism includes a supply roll of recording paper 12, a guide pole 34 provided on an unshown portion of the typewriter body for directing the recording paper 12 to a printing portion which will hereinafter be described, a head holder member 36 for holding the thermal head 20, the head holder member 36 being pivotally supported on an unshown shaft extending through openings 38 and normally biased in the direction of arrow E by a leaf spring 40 provided on a member 39 of the body 2 and by a link 42 connected to the leaf spring 40, a roller 44 pivotally supported on said member 39 so as to face the islands 28 on the thermal head 20 and resiliently urge the recording paper 12 against the thermal head 20 while intermittently rotating in the direction of arrow F to thereby intermittently feed the recording paper 12 in the direction of arrow G, a gear 48 secured coaxially with the roller 44, and a pinion gear 50 meshing with the gear 48 and mounted on the drive shaft of a pulse motor 52 secured to the member 39. The supply paper roll 32 has its center opening 56 rotatably supported on an unshown shaft provided in the body 2. During one incremental feed thereof, the recording paper 12 is fed by an amount corresponding to the length of island 28 in the direction of arrow C-D shown in FIG. 2, and as will be apparent from FIG. 3, the recording paper is intermittently fed five steps for one-character printing.

Figure 5:
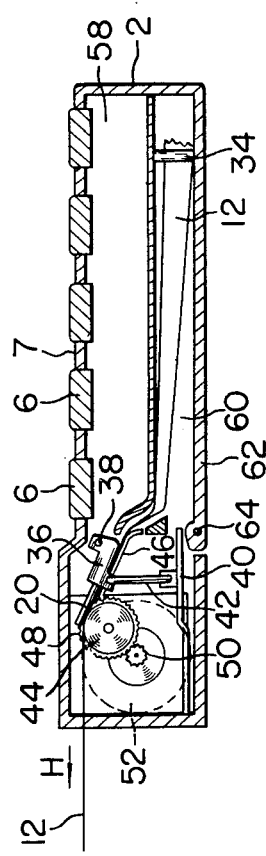
FIG. 5 is a vertical cross-section of the FIG. 1 typewriter.

The printing mechanism shown in FIG. 4 is incorporated in the typewriter body 2 in the manner as shown in the cross section of FIG. 5. In FIG. 5, reference numeral 58 designates a space for accommodating therein an unshown control circuit of the typewriter, 60 a paper supply chamber for receiving therein the supply roll 32 of the recording paper 12, and 62 a back cover pivotally mounted on a shaft 64 and opened and closed for replacement of the paper supply roll 32. The recording paper 12 is resiliently held between the thermal head 20 and the roller 44 by the resilient pressure force imparted from the spring 40 to the thermal head 20 through the link 42 and the head holder member 36, and under these conditions, the islands 28 on the thermal head 20 are urged into intimate contact with the recording paper 12. In such positions, when the pulse motor 52 is rotated stepwise, the recording paper 12 is intermittently fed by a predetermined amount in the direction of arrow II, so that the fed portion of the recording paper 12 is drawn from the supply roll 32. Thus, when a key 6 on the key board 7 is selected to provide a desired printed character, the selective heating of an island 28 on the thermal head 20 and the one-step advance of the pulse motor 52 are alternately repeated five times, as a result of which a desired printed character is provided on the recording paper 12 in the form as shown in FIG. 3, whereafter the pulse motor 52 is further advanced a suitable number of steps, whereby the subsequent unprinted or blank portion of the recording paper 12 faces and bears upon the islands 28 on the thermal head 28 to effect impression of a new character.

Figure 6:
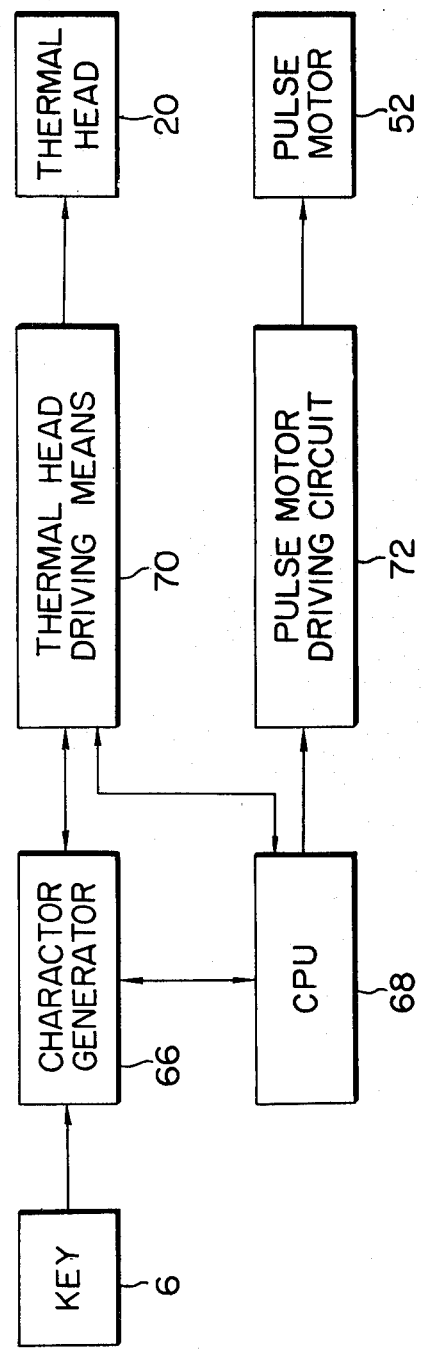
FIG. 6 is a block diagram of the control circuit for the FIG. 1 typewriter.

The thermal head 20 and the pulse motor 52 may be controlled in the described manner by a control circuit as shown in the block diagram of FIG. 6. When a desired character is selected by a key 6, a character generator 66 provides a character signal displayed in 5×7 dot-matrix corresponding to the character, and seven such signals for a first row are initially applied to a thermal head driving circuit 70 for a predetermined time in order that seven islands 28 on the thermal head 20 may be selectively heated sequentially in each row by a control signal from CPU 68. Subsequently, a one-step advance signal is imparted to a pulse motor driving circuit 72 by a signal from CPU 68 to effect one-step rotation of the pulse motor 52 and feed the recording paper 12 by an amount corresponding to the length of an island 28 in the direction of arrow C-D shown in FIG. 2, whereafter seven of 5×7 character signals for a second row are applied to the thermal head driving circuit 70 for a predetermined time. Similar operation is further repeated until there is provided on the recording paper 12 a desired printed character which is determined by the selection of 5×7 dot-matrix. After termination of the printing operation, a stepwise advance signal is suitably applied from CPU 68 to the pulse motor driving circuit 72 to feed the recording paper 12 by a predetermined amount, thus preparing for a subsequent printing cycle.

Most of the control circuit for providing the printing may be integrated by a known method and the size thereof does not exceed that of the keyboard. In other words, such control circuit only occupies a very small space within the body 2.

Figure 7:
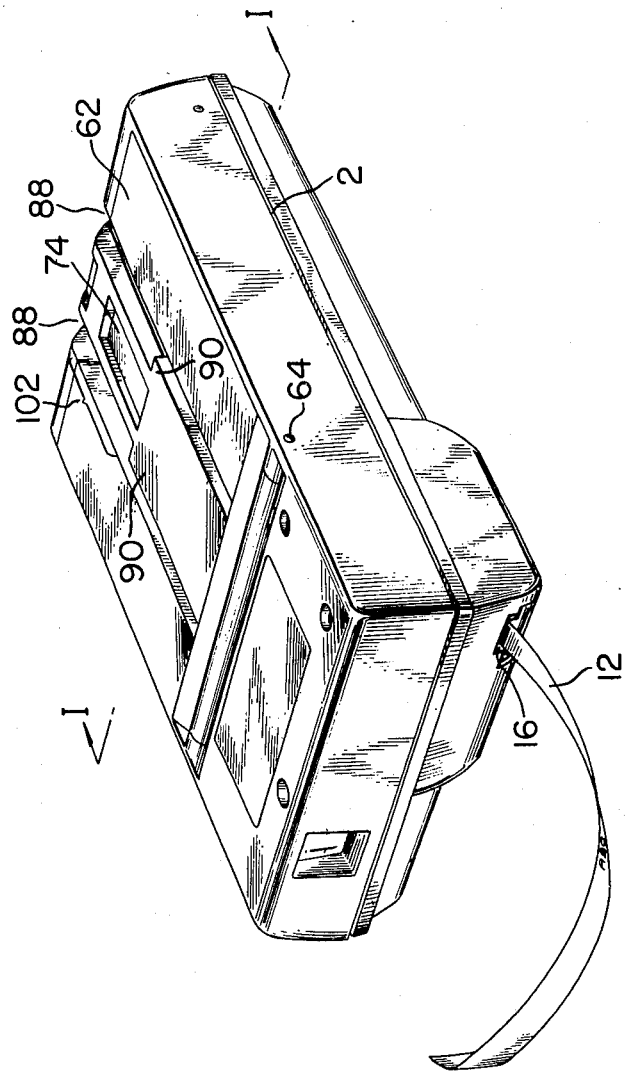
FIG. 7 is a perspective view showing the back side of the FIG. 1 typewriter.

FIG. 7 is a perspective view of the typewriter body 2 as seen from the back side thereof. As previously described, the back side of the body 2 is provided with a back cover 62 pivotally mounted on the shaft 64 and free to open and close. In a portion of the back cover 62, there is formed a display window 74 for displaying the remaining amount of the supply roll 32 of the recording paper 12. Such display window 74 is formed of transparent acryl sheet so that the remaining amount of the paper roll 32 from time to time may be seen therethrough.

Figure 8:
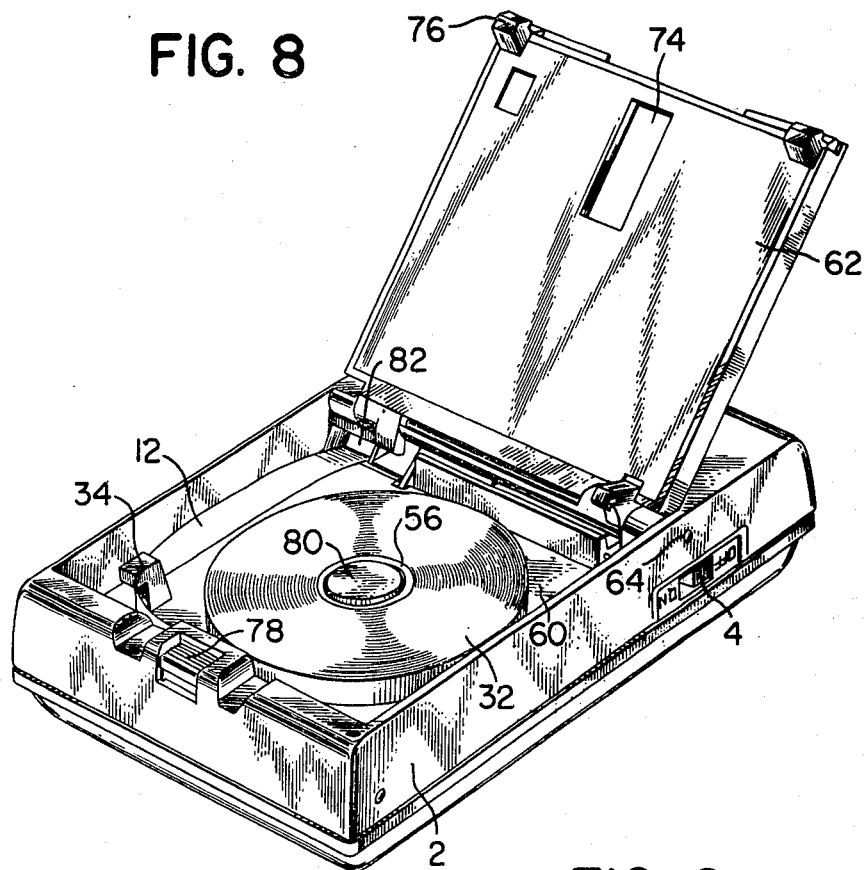
FIG. 8 is a perspective view showing the back side of the FIG. 1 typewriter with the back cover thereof opened.

FIG. 8 is a perspective view of the typewriter body 2 as seen from the back side thereof, with the back cover 62 in open position. In this figure, reference numeral 76 designates hooks engageable with unshown engaging members provided on the body 2 to prevent the back cover 62 in its closed position from being inadvertently opened. Designated by reference numeral 78 is a lever for releasing the engagement between the engaging members and the hooks 76 to permit the back cover 62 to be opened when it is desired.

Figure 9:
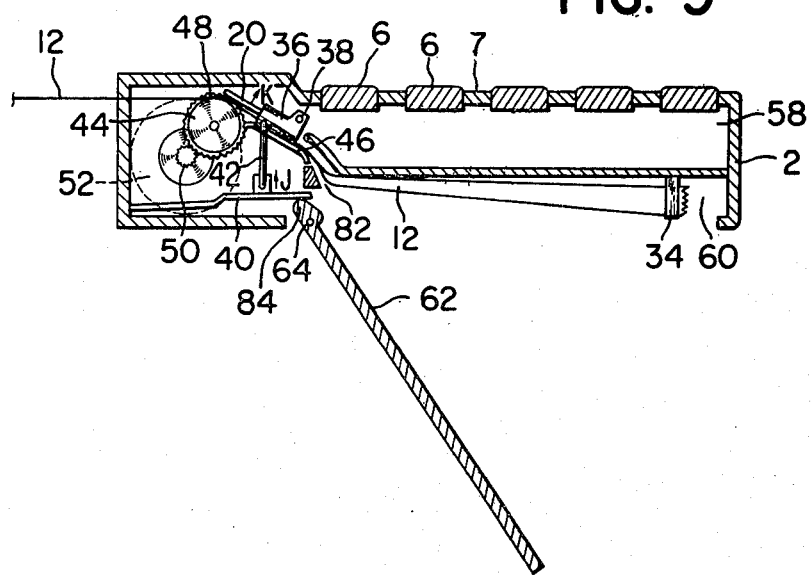
FIG. 9 is a vertical cross-section of the typewriter when in the position of FIG. 8.

When the supply paper roll 32 is to be inserted, the back cover 62 is opened. The center opening 56 of the paper roll is fitted on a shaft 80 projectedly provided in the paper supply chamber 60, and then the leader portion of the recording paper 12 is passed over the guide pole 34 and the leading end of the recording paper is inserted into a guide aperture 82. When the back cover 62 is in its open position as shown in FIG. 9, the spring 40 is moved in the direction of arrow J by a cam plate 84 integral with the back cover 62, so that the link 42 is caused to rotate the thermal head holder member 36 and the thermal head 20 in the direction of arrow K about the shaft apertures 38, whereby the thermal head 20 is released from its resilient contact with the roller 44. Thus, by inserting the leading end of the recording paper 12 through the guide port 82 during the placement of the recording paper 12, the recording paper 12 is fed along the guide plate 46 and directed into the clearance between the thermal head 20 and the roller 44. In this position, when the back cover 62 is closed, the thermal head 20 and the roller 44 resiliently hold the recording paper 12 therebetween in the manner as shown in FIG. 5, and after that, the recording paper 12 is fed in the direction of arrow 11 by stepwise rotation of the pulse motor 52, namely, of the roller 44, and the fed portion of the recording paper is drawn from the paper roll 32. Thus, in the present embodiment of the typewriter, placement of the recording paper 12 is facilitated by a clearance provided between the thermal head 20 and the roller 44 when the back cover 62 is opened to permit insertion of the supply paper roll 32.

The keys 6, as shown in FIG. 1, are arranged in a projected form on the surface of the keyboard 7 and such arrangement is relatively good in operability when the typewriter stably rests on top of a desk. However, when this typewriter is to be used as an aid for conversation, the place where it is used is not always a stable environment free of vibrations or crowds but the typewriter may often be used on vehicles which undergo vibrations or in the crowds which restrict the free movement of the user's fingers. In these cases, possibilities of wrong operation or double strike of a key would possibly occur to hamper a reliable and smooth operation of the typewriter. This is not only the problem of the environment where the typewriter is used, but also a problem which would necessarily be encountered as by a physically multi-handicapped person who is deaf-mute and limb-disabled.

In contrast, the typewriter of the present embodiment solves these problems by a special adapter mounted on the keyboard 7.

Figure 11:
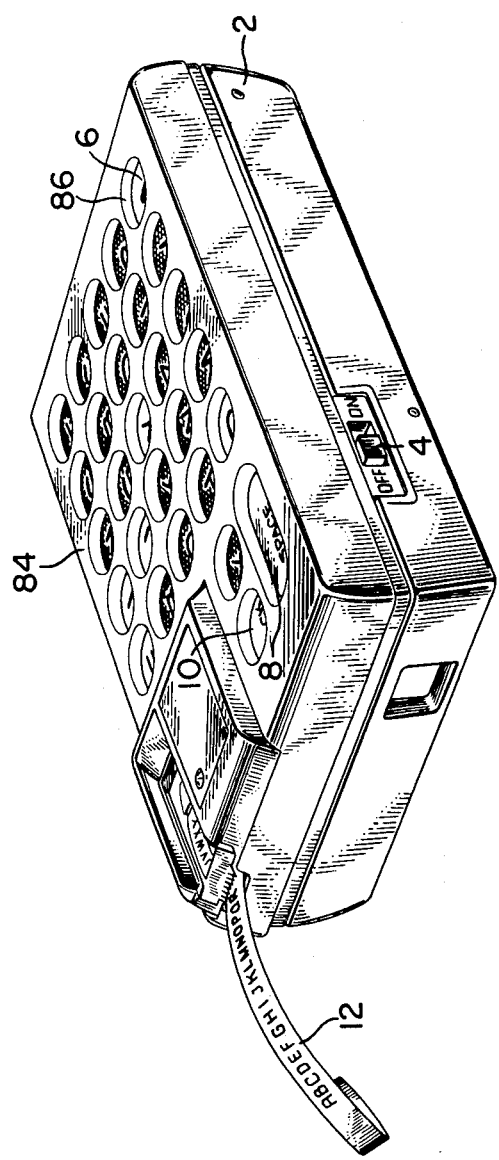
FIG. 11 is a perspective view of the FIG. 1 typewriter with the FIG. 10 keyboard adapter attached thereto.

FIG. 10 is a perspective view of a keyboard adapter 84 before it is mounted on the typewriter body 2. The keyboard adapter 84 has a plurality of finger reception holes 86 corresponding to the keys 6, 8 and 10 on the keyboard 7. The position in which the keyboard adapter is mounted on the keyboard 7 is shown in the perspective view of FIG. 11. As shown in FIG. 11, the key tops of the keys 6, 8 and 10 are positioned below the level of the keyboard surface by mounting the keyboard adapter 84 with respect to the body 2 and the keys 6, 8 and 10 must be operated through the key holes 86 and therefore, the finger reception holes 86 can hold the operator's fingers even when the typewriter is used in a vibrating environment, thereby eliminating any wrong key operation.

It is desirable that the depth of each finger reception hole 86 can be freely selected in accordance with the situations in which the typewriter is used. More specifically, greater depth of the finger reception hole 86 will result in a greater barrier against quick operation, but ensure a better finger-holding characteristic and accordingly, a higher reliability of key operation. Conversely, smaller depth of the finger reception hole 86 will enable relatively quick key operation but somewhat reduce the finger-holding characteristic. In view of such incompatibility, it is desirable that greater depth for the finger reception holes 86 can be selected when the typewriter is used in an environment of great vibrations or used by a person with seriously handicapped fingers and that smaller depth for the finger-reception holes 86 can be selected when the typewriter is used in an environment of lesser vibrations or used by a person with less handicapped fingers.

In the typewriter of the present embodiment, the above-described requirements are met by preparing two types of keyboard adapters 84A and 84B, of which the adapter 84A has deeper finger reception holes 86 and the adapter 84B has shallower finger reception holes 86, and the provision of keyboard adapters 84 having a greater variety of depths of the holes 86 would of course be effective to meet further various situations.

The typewriter of the present embodiment, as has been described hitherto, achieves various merits such as improved operability and greater flexibility to the environments or situations in which it is used, by providing adapters 84 having finger reception holes 86 for holding the user's fingers when they depress the keys 6, 8 and 10.

Referring now to the perspective view of FIG. 7 which shows the back side of the typewriter body 2, two parallel grooves 88 extend in the back side including the back cover 62 of the body 2. In the vicinity of the center of the back cover, these grooves 88 are partly covered with flanged portions 90 hanging over the grooves 88.

These grooves 88 and flanged portions 90, as will further be described, are provided to further enhance the usability and operability of the shown typewriter.

As often mentioned previously, the typewriter of the present embodiment, which should suitably be called the pocketable type rather than the portable type, is suited for use as aid for a deaf-mute to carry with him for making conversation, and the problem lies in how he carries it with him. For example, if he carries it in his bag, he must take it out of the bag every time he wants to converse, and this means a problem that he is required to go through cumbersome procedures to make conversation which should originally be made at ease, namely, the procedures of taking the typewriter out of his bag and making preparations until it becomes ready for use. Also, when he carries the typewriter in his pocket, the procedures involved will not be so cumbersome as those required when he carries it in his bag, but he will still suffer from some cumbersome procedures. It will thus be apparent that carrying the typewriter in his bag or pocket and using it to begin conversation after going through the above-mentioned procedures is very inefficient as compared with the everyday oral conversation made by ordinary persons.

The present embodiment proposes a novel method which will permit a compact typewriter to be fitted to a wrist for use in the same manner as a wrist watch. Wearing such typewriter on the wrist will be greatly effective in that it makes the operability of the typewriter approximate to that of the wrist watch.

FIG. 12 is a perspective view of a fitting belt 91 which permits the typewriter of FIG. 1 to be fitted to a wrist for use in the same manner as a wrist watch. The belt 91 is substantially similar in construction to the belt for wrist watch or the like and need not be described in particular. The belt 91 only differs from the wrist watch belt in that it has a somewhat great width sufficient to mount and hold the typewriter which is somewhat weightier than the wrist watch or the like and that a portion of the belt 91 is formed as an expansible portion 92 of expansible textile. Designated by 94 is a mount portion to which the typewriter is mounted and which is provided with two fittings 96 engageable with the grooves 88 shown in FIG. 7. The two fittings 96 are provided with flanged portions 98 extended from the mount portion 94 by a predetermined distance and turned back to face each other. In the portions of the mount portions 94 which face the flanged portions 98, there are provided leaf-springs 100 for imparting resilient pressure forces toward the flanged portions 98. The belt 91 of the described construction is fitted to a wrist in the same manner as shown in FIG. 13.

Figure 14:
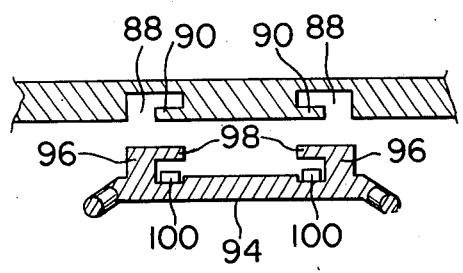
FIG. 14 is a fragmentary cross-sectional view including a fragmentary cross-section of the typewriter body taken along line I—I in FIG. 7 and a fragmentary cross-section of the mount portion taken along line II—II in FIG. 12, and showing the body prior to being mounted on the mount portion.
Figure 15:
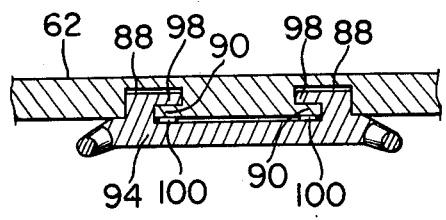
FIG. 15 shows, in cross-section, the body as mounted on the mount portion.

FIG. 14 illustrates the relationship between the back side of the typewriter body shown in FIG. 7 and the mount portion 94 shown in FIG. 12, and is a fragmentary cross-sectional view of the back cover 62 taken along line I—I of FIG. 7 and of the mount portion 94 taken along line II—II of FIG. 12. In FIG. 14, reference numerals similar to those in FIGS. 7 and 12 designate similar parts shown in those figures. The grooves 88 formed in the back cover 62 are engageable with the fittings 96 of the mount portion 94, and the flanged portions 90 hanging over the grooves 90 are engageable with the flanged portion 98 hanging over from the fittings 96, thus serving to secure the typewriter body 2 to the mount portion 94. To secure the typewriter body 2 to the mount portion 94, the portions of the grooves 88 in the back side of the typewriter body 2 which are not covered by the flanges 90 may be made to serve as guide portions 102, and the fittings 96 of the mount portion 94 and the flanges 98 may be fitted into the guide portions 102, whereafter the body 2 and the mount portion 94 may be slidingly moved relative to each other in the longitudinal direction of the grooves 88 so that the flanges 90 and 98 are brought into engagement. The leaf springs 100, with the flanges 98, serve to resiliently hold the flanges 90 to thereby prevent any backlash of the parts which would result from the play thereof. FIG. 15 shows the cross-section of the fitting portion when the body 2 has been completely attached to the mount portions 94. The play of each part is preferably be of such a degree that it provides no inconvenience in mounting the body 2 to the mount portion, and should be neither extremely larger nor extremely small. An extremely large play would result in production of backlash when the typewriter body 2 has been attached to the mount portion 94 of the belt 91, while an extremely small play would make it difficult to smoothly attach the body 2 to the mount portion 94.

Figure 13:
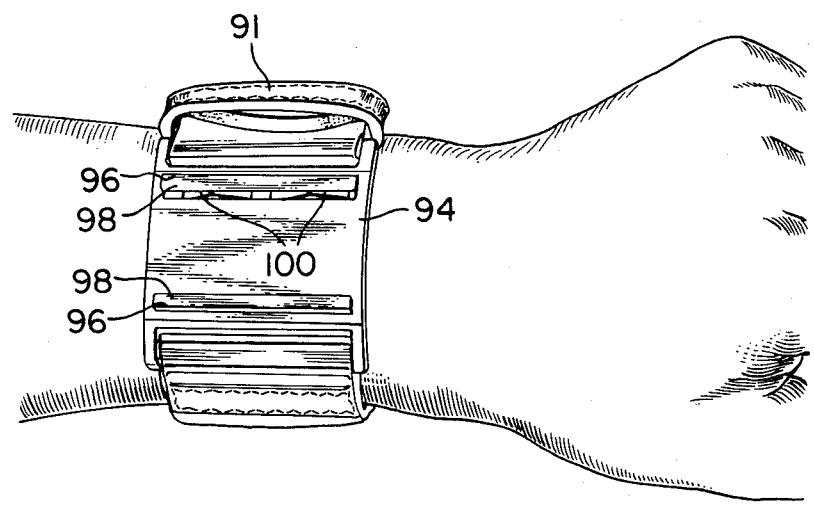
FIG. 13 is a perspective view showing the FIG. 12 belt as mounted on the wrist.
Figure 16:
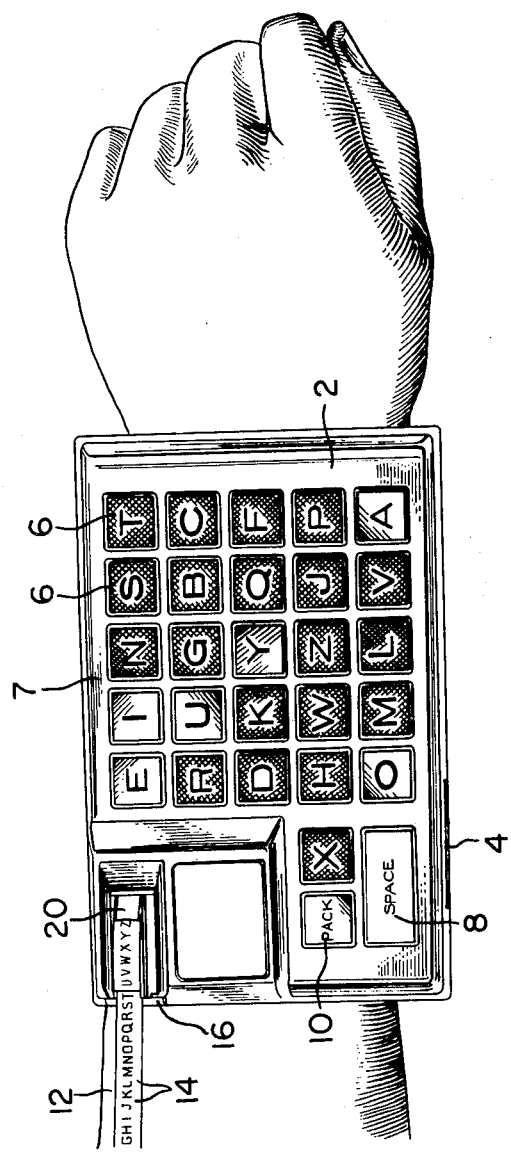
FIG. 16 is a plan view showing the typewriter mounted on the wrist.

FIG. 16 shows the typewriter body 2 as attached to the mount portion 94 of the belt 91 fitted around a wrist, as illustrated in FIG. 13. The operator may wear the typewriter body 2 on his wrist in the position as shown in FIG. 16 and when a need for conversation occurs to him, he may immediately operate the power switch 4 to render the typewriter operative, and then, by selectively operating the keys 6, he may provide any desired message on the unwinding paper 12.

The above-described design which permits the typewriter body 2 to be mounted on the wrist in the same manner as a wrist watch will greatly enhance the portability and operability of the typewriter and will be highly effective as an aid to be used for everyday conversation by the deaf-mute.

Figure 17:
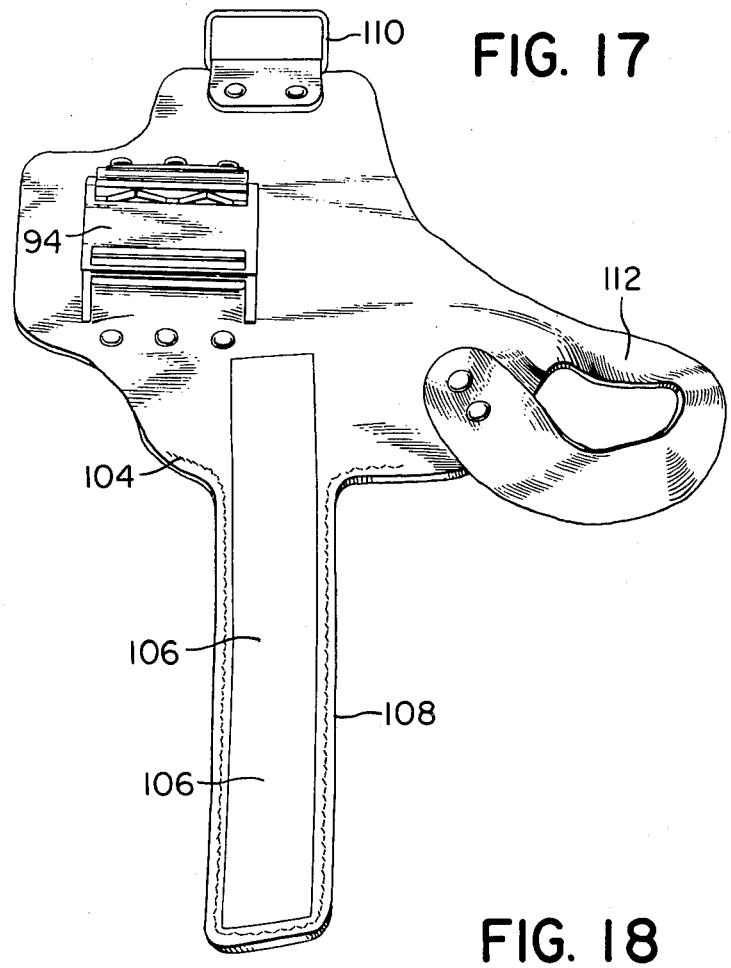
FIG. 17 is a perspective view showing another form of the belt for mounting the typewriter on the wrist.
Figure 18:
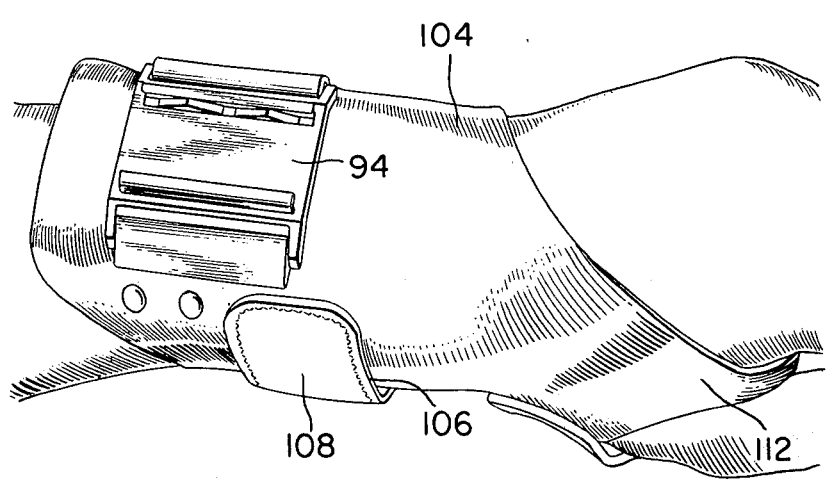
FIG. 18 is a perspective view showing the FIG. 17 belt mounted on the wrist.
Figure 22:
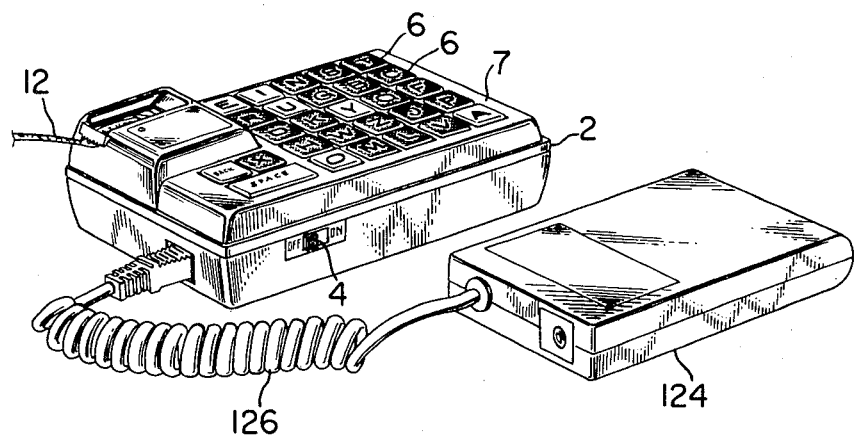
FIG. 22 shows, in perspective view, the typewriter with a battery case.

FIG. 17 shows a belt 104 provided with a mount portion 94 similar in construction to that shown in FIG. 12, which belt is likewise used to fit the typewriter body 2 to the wrist. The belt 104 is designed so as not to impart unnatural fatigue or pain to the wearer's wrist and not to provide unstable fit of the typewriter to the wrist, because the typewriter body 2 is somewhat heavier than the wrist watch and would cause such inconvenience if it is worn for a long time. The belt 104, excepting for the mount portion 94, is generally formed of soft leather-like material, and includes a fastening belt portion 108 having attached thereto peelable adhesive textile 106 (tradename: VELCLO), a metal ring 110 through which the belt portion 108 may be passed to fit around the wrist, and a thumb holding portion 112 in which the wearer's thumb may be inserted. Such belt 104 may be mounted on the wrist in the manner as shown in FIG. 18, but unlike that shown in FIG. 13, the belt 104 has such a wide area of contact with the wrist that will provide a highly stable fit and good retention characteristic, and the thumb holding portion 112 contributes to further enhancement of said stability and retention characteristic. Thus, such belt is meritorious in that it permits the wearer to wear the typewriter on his wrist for a long time without fatiguing the wearer.

In FIG. 16, the typewriter body 2 is shown as being mounted on the left-hand wrist as previously mentioned, and features of the typewriter of the present embodiment will now be described with respect particularly to FIG. 16.

The operator usually wears the typewriter body 2 on his wrist in the manner as shown in FIG. 16, and whenever a need for conversation arises, he may suitably operate the keys 6 and space key 8 on the keyboard 7 to provide a desired message on the recording paper 12 and present to his partner the recording paper 12 as it is discharged through the port 16, whereby the message may be communicated.

The keys 6 on the keyboard 7 are suitably arranged so that they can be operated only by the right hand, and for the purpose of facilitating visual selection of the keys, some of the keys 6 including vowel keys may have their key tops differently colored from the other keys 6. In the typewriter of the present embodiment, the keys 6 representing the vowels "A", "E", "I", "O" and "U" and the center key 6 representing "Y" are differently colored from the other keys 6. Such design will be effective to enhance the efficiency with which the keys on the keyboard 7 are selected.

The key "X" is located adjacent the back space key 10. Such arrangement of the key "X" adjacent the back space key 10 will enable a highly efficient cancellation of any misprinted character, in view of the previously described fact that when a misprint has occurred, the back space key 10 is depressed to bring the misprinted portion of the recording paper back to the position corresponding to the thermal head 20, whereafter another character, usually "X", is printed in superposed relationship with the misprinted character to cancel the misprint. The key "X" is not the only possible key which may be located adjacent the back space key 10, but a key representing any other character or symbol which will be suited for the cancellation of misprinted character by superposition of a new character upon the misprint may be located in place of the key "X". If the misprinted character is "X" itself, any other suitable character may be superposedly printed on the misprinted character "X" to thereby accomplish similar cancellation.

There is another possible problem which might occur when the typewriter body 2 mounted on the wrist in the manner as shown in FIG. 16 is used for conversation. The problem is that the characters on the key tops of the keys 6 on the keyboard 7 and the characters printed on the recording paper 12 are all in regular or erect position with respect to the operator when the typewriter body 2 is on the operator's wrist, whereas both the characters on the key tops and the printed characters are in inverted position with respect to the partner of the conversation.

If the communication of messages could only be unilateral from the operator to the partner, it would not be so difficult to present the printed message to the partner in the regular position as by flexing the printed portion of the recording paper 12 or by cutting it off suitably, because the recording paper 12 is flexible and also can be cut at the port 16. However, conversation is mutual exchange of information and there will often arise the need to receive a message from the partner. In such cases, the partner will have to operate the keys 6 on the keyboard 7 by selecting the keys as he sees their key top characters in inverted form, and this will be quite inefficient. In addition, the printed characters 14 on the recording paper will also appear inverse to the partner and this will add to the difficulties in confirming the message printed by key operation.

To meet such problem, the present invention presents a typewriter as another embodiment of the information output device which will serve as an aid for conversation.

FIG. 19 shows, in perspective view, the back side of the typewriter as an alternative embodiment of the information output device. The bottom surface and the back cover 62 of the body 2 are formed with two parallel grooves 88 which extend from one end of the body to the area of a disc 116 rotatable about a shaft 114 provided in the back cover 62. In the area of the disc 116, flanged portions 90 extend longitudinally of and hang over the two grooves 88, respectively. The typewriter having such back side construction may be mounted on the mount portion 94 of the belt shown in FIG. 12. More specifically, the disc 116 rotatably disposed on the back cover 62 of the typewriter body 2 is kept in the position as shown in FIG. 19 while the fittings 96 and flanges 98 of the mount portion 94 shown in FIG. 12 are fitted in guide portions 102 provided by the portions of the two grooves 88 which have no flange 90, whereafter the typewriter body 2 and the mount portion 94 are moved relative to each other longitudinally of the grooves 88 so that the flanges 90 and 98 are engaged with each other, whereby the typewriter body 2 may easily be secured to the mount portion 94. The fittings 96 and flanges 98 of the mount portion 94 and the disc 116 must be constructed such that the lengths of the fittings 96 and flanges 98 do not exceed the length of that portion of each groove 88 formed in the disc 116. The typewriter thus secured to the mount portion 94 is freely rotatable about the shaft 114. Thus, the operator may first mount the band 91 of FIG. 12 on his wrist in the manner as shown in FIG. 13, whereafter he may mount the typewriter body 2 on the mount portion 94 through the previously described procedures to thereby render the typewriter ready for use, and whenever he needs to make conversation, he may selectively operate the keys 6 with the body 2 in regular or erect position with respect to himself and provide a necessary message printed on the recording paper 12, whereafter he may rotate the typewriter body 2 on the mount portion 94 through 180° to thereby present the printed message to his partner in its regular position with respect to the latter. Conversely, when he wants to receive a message from the partner, he may rotate the typewriter body 2 until it assumes its regular position with respect to the partner, whereafter he may have the keys 6 selectively rotated by the partner to accomplish the printing of a necessary message, and then he may rotate the body 2 on the mount portion 94 through 180° until the message printed on the recording paper 12 assumes its regular position with respect to himself, and thus he may read the message.

The rotational position of the body 2 on the mount portion 94 may be freely set, but it is desirable for enhanced operability that the body 2 can be set to two positions, namely, the position in which the typewriter assumes its regular position with respect to the operator himself and the position in which the typewriter assumes its regular position with respect to the partner of the conversation. For example, if the typewriter body 2 is freely rotatable on the mount portion 94, the body 2 may possibly rotate every time a key 6 is operated and this will greatly aggravate the operability of the typewriter. In addition, when the typewriter is not in use, the body 2 may move each time the arm wearing it is moved, and this will seriously limit the wearer's everyday activities. To avoid this, a mechanism may be added for click-stopping the disc 116 at two positions, namely, the rotational position shown in FIG. 19 and a position 180° out of phase therewith.

FIG. 20 is a cross-sectional view taken along line III—III of FIG. 19. The click mechanism mentioned above comprises click balls 120 spring-biased against the peripheral side of the disc 116 by springs 118, and click grooves formed in the disc 116 as will further be described.

FIGS. 21(a) and 21(b) are fragmentary plan views of the disc 116 and the back cover 62. In these figures, reference numeral 122 designates the click grooves. When the click balls 120 are not received in the click grooves 122, as shown in FIG. 21(a), the disc 116 is free to rotate with respect to the back cover 62 and thus, the body 2. When the click balls 120 are received in the click grooves 122, as shown in FIG. 21(b), the freedom of rotation of the disc 116 relative to the back cover 62 or the body 2 may be limited to thereby set the body 2 on the mount portion 94 selectively to the position in which the typewriter is erect or regular with respect to the operator and the position in which the typewriter is erect or regular with respect to his partner.

The typewriter body 2 of FIG. 1 may incorporate therein a driving power source, but a battery as the power source is usually so great in volume and weight as to prevent the compactness of the body 2 and in addition, too great a volume and weight of the body 2 would not only limit the everyday activities of the wearer but also cause fatigue of the arm wearing the typewriter in the manner as shown in FIG. 16. Also, the limitations in volume and weight of the battery incorporated in the body 2 lead to limitations in the capacity of the battery and thus, if the typewriter is used for a long time, the battery will have to be frequently changed or charged up, which will reduce the operability of the typewriter.

To meet such problem, the present invention provides a chargeable battery case 124 for use with the typewriter body 2, which battery case may be connected with the body 2 through a power supply cord 126 to permit supply of the power. This contributes to a reduced size and lighter weight of the typewriter body 2. The battery case 124 is pocketable and designed so as not to form any obstacle when the typewriter body 2 is worn and used on the wrist.

The medium through which the deaf-mute makes conversation is not restricted to messages printed on the recording paper in the described manner.

More specifically, typewriters having printing mechanisms are not the only possible form of the information output device as the aid usable by deaf-mutes for conversation, but any other message display means could be used. For example, messages provided by a combined arrangement of characters produced by selection of successive keys on the keyboard may be displayed on character display means such as LED, liquid crystal, cold cathode discharge tube or the like, with a result that communication of messages can be performed as fully as by the printed characters on the recording medium.

From such a viewpoint, the present invention provides a character display device as a further embodiment of the information output devices.

Figure 23:
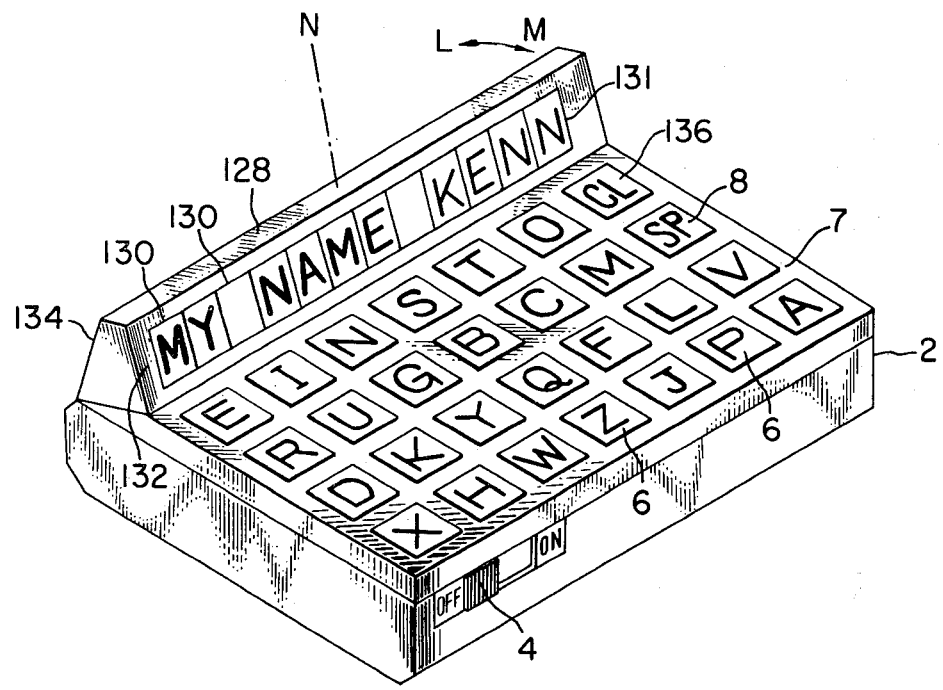
FIG. 23 is a perspective view of a character display device which is a further embodiment of the information output device according to the present invention.

FIG. 23 is a perspective view of the character display device. The difference in construction of this device from the typewriter of FIG. 1 is this: the typewriter of FIG. 1 is designed such that the keys 6 and so forth on the keyboard 7 on top of the body 2 are selectively operated to thereby provided printed characters on the recording paper 12 and these printed characters are presented to the partner of the conversation, whereas the character display device of FIG. 23 are designed such that the keys 6 and so forth on the keyboard 7 on top of the body 2 are selectively operated to thereby provide any desired characters displayed on the character display portion 128 provided on the body 2 and these characters are presented as a message.

In the operation of the keys and the like, however, the character display device of FIG. 23 is identical with the typewriter of FIG. 1.

The display portion 128 is provided with a display device 131 comprising twelve character display elements 130 arranged so as to be capable of displaying twelve characters in a row at a time. Two of such display device 131 are disposed on a surface 132 of the display portion facing the operator and on a surface facing the partner of the conversation, respectively, just in the same manner. On the display device 131, such characters as shown in FIG. 23 may be displayed in the opposite surfaces 132 and 134 by selecting the keys 6 and space key 8 on the keyboard 7 and depressing them in succession. The character display elements 130 may be any of various elements such as well-known LED character display elements, liquid crystal character display elements, cold cathode discharge tube character display elements or the like, but with the portability and compactness of the device taken into account, display elements using LED or liquid crystal would be preferable because of their low power consumption and light weight. To cancel the characters displayed on the display device 131 and provide a new display, a clear key 136 may simply be depressed, thereby cancelling all the displayed characters on the display device 131.

The character display device of FIG. 23, like the typewriter of FIG. 1, is constructed to permit attachment thereto of a keyboard adapter or mounting thereof on a wrist, but the difference between the two is whether a message is recorded on the recording paper or displayed on the display device. The character display device of FIG. 23 is to be worn for use on the wrist in the same manner as the typewriter of FIG. 16, but the display device on the surface 132 of the display portion 128 acts as monitor and the display device 131 on the surface 134 serves the communication of message.

The character display device 131 is usually expensive and still consumptive of electric power, if not so extremely, and therefore, provision of two functionally similar display devices 131 on the opposite surface of the display portion is not desirable in terms of cost and complexity of construction as well as the limited service time resulting from the use of power supply battery. For this reason, such display device may be provided only on that surface 132 of the display portion 128 which faces the operator and the display portion 128 may be designed such that it is rotatable on the body 2 through 180° in the direction of arrow L or M about an axis M, as required. In such construction, when a message need be communicated to the partner of conversation, the operator may select the keys 6 and so forth with the display device 132 facing him and with the display device as monitor, to thereby cause a desired message to be displayed on the display device, whereafter the display portion 128 may be rotated through 180° in the direction of arrow L or M about the axis M, whereby the displayed message on the display device 131 may be presented and communicated to the partner in such a manner that the message faces the partner in its regular or erect position.

As has hitherto been described of some embodiments of the information output device according to the present invention, the invention when carried out will bring about great benefits to deaf-mutes whenever they want to make conversation.

It will be apparent that widely different embodiments may be possible without departing the spirit and scope of the invention, and it should be understood that the invention is restricted only by the appended claims and not restricted to the specific embodiments disclosed herein.

We claim:

1. An information output device comprising:
   character output means for visibly outputting at least one of a plurality of characters such as letters, numbers, symbols, etc.;
   a keyboard on which keys corresponding to said characters are disposed for the selection of said characters;
   a body for housing said character output means and on one side of which is disposed said keyboard, said body including a cover movable between open and closed positions and in the open position thereof providing access to the interior of said body so that objects may be inserted thereinto, said cover being disposed on that side of body which is opposite the side thereof on which said keyboard is disposed;
   a belt provided with said body and adapted to be secured about the wrist of the user, said belt being disposed on that side of said body which is opposite the side thereof on which said keyboard is disposed; and
   a mechanism provided with each of said cover and said belt for mounting said body and said belt removably with respect to each other, said mechanism including means associated with one of said cover and said belt defining a groove, and a engaging member associated with the other of said cover and said belt for engaging said groove, and a resilient member mounted in at least a portion of said groove for securing said engagement of said engaging member and said groove.

2. An information output device according to claim 1, wherein said belt includes a portion through which a thumb of the user may project to prevent said belt from rotating around the wrist of the user.

3. An information output device according to claim 1, wherein said body comprises a rotating mechanism to permit said body to be rotated on said belt through a desired angle, and wherein said mounting mechanism provided with said cover of said body is provided with said rotating mechanism.

4. An information output device according to claim 3, wherein said rotating mechanism permits said body to be rotated on said belt through an angle of about 180°, and wherein said rotating mechanism further includes a click mechanism for click-stopping said body at a suitable rotational position.

5. An information output device according to claim 4, wherein said rotating mechanism is provided with a rotating member, and said click mechanism is provided on the edge of the rotating member.

6. An information output device according to claim 5, wherein said belt includes a portion through which a thumb of the user may project to prevent said belt from rotating around the wrist of the user.

7. An information output device according to claim 6, wherein said body comprises a rotating mechanism to permit said body to be rotated on said belt through a desired angle, and wherein said mounting mechanism provided with said cover of said body is mounted with said rotating mechanism.

8. An information output device according to claim 7, wherein said rotating mechanism includes a click mechanism for click-stopping said body at a suitable rotational position.

9. An information output device according to claim 8, wherein said rotating mechanism is provided with a rotating member, and said click mechanism is provided on the edge of the rotating member.

10. An information output device according to claim 9, wherein said belt includes a portion through which a thumb of the user may project to prevent said belt from rotating around the wrist of the user.

11. An information output device comprising:
character output means for visibly outputting at least one of a plurality of characters such as letters, numbers, symbols, etc.;
a keyboard on which keys corresponding to said characters are disposed for the selection of said characters;
a body for housing said character output means and on one side of which is disposed said keyboard;
a belt provided with said body and adapted to be secured about a portion of the user, said belt being disposed on that side of said body which is opposite the side thereof on which said keyboard is disposed; and
a mechanism provided with each of said belt and said body for mounting said body and said belt removably with respect to each other, one of said mechanisms being provided with a rotating mechanism to permit said body to be rotated on said belt through a desired angle, said rotating mechanism including a groove, said rotating mechanism including a resilient member disposed in said groove, the other of said mounting mechanisms including means engageable with said groove in said rotating mechanism and having an engaging portion for securely receiving said resilient member.

12. A device according to claim 11, wherein said belt includes a portion adapted to be engaged with a thumb of the user.

13. An information output device according to claim 11, wherein said resilient member comprises a leaf spring.

14. An information output device comprising:
character output means for visibly outputting at least one of a plurality of characters such as letters, numbers, symbols, etc.;
a keyboard on which keys corresponding to said characters are disposed for the selection of said characters;
a body for housing said character output means and on one side of which is disposed said keyboard;
a belt provided with said body and adapted to be secured about a portion of the user, said belt being disposed on that side of said body which is opposite the side thereof on which said keyboard is disposed; and
a mechanism provided with each of said belt and said body for mounting said body and said belt removably with respect to each other, one of said mechanisms being provided with a rotating mechanism to permit said body to be rotated on said belt through a desired angle, said rotating mechanism including a groove, and the other of said mounting mechanisms provided with an engaging portion for engaging said groove of said rotating mechanism, said engaging portion having length that is completely received in said groove of said rotating mechanism.

* * * * *

UNITED STATES PATENT AND TRADEMARK OFFICE
CERTIFICATE OF CORRECTION

PATENT NO. : 4,444,520

DATED : April 24, 1984

INVENTOR(S) : TAKAYOSHI HANAKATA, ET AL.

It is certified that error appears in the above-identified patent and that said Letters Patent is hereby corrected as shown below:

Column 2

Line 57, change "mechamism" to --mechanism--.

Column 5

Lines 13 and 14, change "thermosensitve" to --thermosensitive--.

Column 6

Line 38, change "D" to --B--.

Column 7

Line 21, change "positions" to --position--.

Line 35, change "28", second occurrence", to --20--.

Column 8

Line 46, change "11" to --H--.

UNITED STATES PATENT AND TRADEMARK OFFICE
CERTIFICATE OF CORRECTION

PATENT NO. : 4,444,520

DATED : April 24, 1984

INVENTOR(S) : TAKAYOSHI HANAKATA, ET AL.

It is certified that error appears in the above-identified patent and that said Letters Patent is hereby corrected as shown below:

Column 10

Line 29, change "great" to --greater--.

Column 11

Lines 4 and 5, change "portions" to --portion--.

Line 5, delete "be".

Line 37, change "inconvenience" to --inconveniences--.

Line 41, change "VELCLO" to --VELCRO--.

Column 15

Line 49, change "M", second occurrence, to --N--.

Line 53, change "132" to --131--.

Line 57, change "M", second occurrence, to --N--.

UNITED STATES PATENT AND TRADEMARK OFFICE
CERTIFICATE OF CORRECTION

PATENT NO. : 4,444,520

DATED : April 24, 1984

INVENTOR(S) : TAKAYOSHI HANAKATA, ET AL.

It is certified that error appears in the above-identified patent and that said Letters Patent is hereby corrected as shown below:

Column 16, line 31
(Claim 1)

Change "a", second occurrence, to --an--.

Signed and Sealed this

Thirteenth Day of November 1984

[SEAL]

Attest:

GERALD J. MOSSINGHOFF

Attesting Officer

Commissioner of Patents and Trademarks